United States Patent
Raghoebardajal

(10) Patent No.: US 11,602,684 B2
(45) Date of Patent: Mar. 14, 2023

(54) PERIPHERAL TRACKING SYSTEM AND METHOD

(71) Applicant: Sony Interactive Entertainment Inc., Tokyo (JP)

(72) Inventor: Sharwin Winesh Raghoebardajal, Surbiton (GB)

(73) Assignee: Sony Interactive Entertainment Inc., Tokyo (JP)

( * ) Notice: Subject to any disclaimer, the term of this patent is extended or adjusted under 35 U.S.C. 154(b) by 433 days.

(21) Appl. No.: 16/751,990

(22) Filed: Jan. 24, 2020

(65) Prior Publication Data

US 2020/0238164 A1 Jul. 30, 2020

(30) Foreign Application Priority Data

Jan. 29, 2019 (GB) ...................................... 1901188

(51) Int. Cl.
*A63F 13/213* (2014.01)
*G06T 7/73* (2017.01)
(Continued)

(52) U.S. Cl.
CPC ............ *A63F 13/213* (2014.09); *G06F 3/039* (2013.01); *G06T 7/74* (2017.01); *H04N 5/2253* (2013.01); *H04N 5/2352* (2013.01)

(58) Field of Classification Search
CPC ......... A63F 13/213; G06T 7/74; G06F 3/039; H04N 5/2253; H04N 5/2352
See application file for complete search history.

(56) References Cited

U.S. PATENT DOCUMENTS

| | | | |
|---|---|---|---|
| 2016/0125592 A1 | 5/2016 | Becker | |
| 2016/0232715 A1 | 8/2016 | Lee | |
| 2017/0249019 A1 | 8/2017 | Sawyer | |
| 2018/0108149 A1* | 4/2018 | Levinshtein | ....... G02B 27/0172 |

(Continued)

FOREIGN PATENT DOCUMENTS

WO 2016041088 A1 3/2016

OTHER PUBLICATIONS

Communication Pursuant to Article 94(3) for corresponding EP Application No. 19214841.9, 9 pages, dated Feb. 9, 2022.

(Continued)

*Primary Examiner* — Afroza Chowdhury
(74) *Attorney, Agent, or Firm* — Matthew B. Dernier, Esq.

(57) ABSTRACT

A system for tracking one or more peripherals operable by a user in a real environment includes: a camera, mountable upon the user, operable to capture images of the real environment, a feature identification unit operable to identify features in images belonging to a first set of images captured by the camera, a peripheral identification unit operable to identify the image position of one or more peripherals in one or more images belonging to a second set of images captured by the camera, and a position determining unit operable to generate first position information for the camera in the real environment in dependence upon one or more of the identified features, and to generate respective second position information for the one or more peripherals relative to the camera in dependence upon the identified image position of the one or more peripherals. The first set of images and the second set of images captured by the camera are interleaved such that groups of one or more images from each set are captured in turn, and the position determining unit is operable to generate third position information identifying the position of the one or more periph- (Continued)

erals in the real environment by combining the second position information corresponding to a given group of images in the second set of images with a function of the first position information corresponding to a group of images in the first set of images preceding the given group of images and the first position information corresponding to a group of images in the first set of images following the given group of images.

14 Claims, 4 Drawing Sheets

(51) Int. Cl.
*G06F 3/039* (2013.01)
*H04N 5/225* (2006.01)
*H04N 5/235* (2006.01)

(56) References Cited

U.S. PATENT DOCUMENTS

2018/0173320 A1 6/2018 Bristol
2018/0318704 A1* 11/2018 Ikenoue ............... A63F 13/655
2019/0377473 A1* 12/2019 Osman ................. A63F 13/25

OTHER PUBLICATIONS

Combined Search and Examination Report for corresponding Application No. GB1901188.1.2, 2 pages, dated Jun. 9, 2019.
Extended European Search Report for corresponding EP Application No. 19214841.9, 10 pages, dated Jun. 4, 2020.
Dominic Brennan, "Everything We Know: Oculus Santa Cruz," URL:https:jjweb.archive.orgjweb/20180714154001/https:jjwww.roadtovr.comjoculus-santa-cruz-release-date-price-specs-everythingweknow/ 4 pages, Jul. 14, 2018.

* cited by examiner

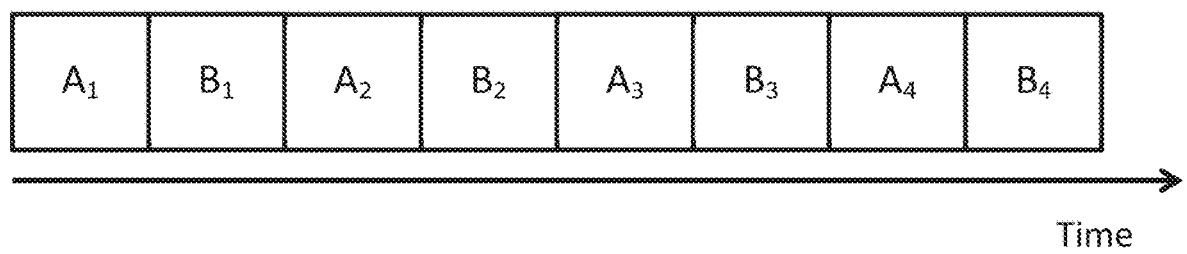
Figure 3
Figure 4a Figure 4b

PERIPHERAL TRACKING SYSTEM AND METHOD

BACKGROUND OF THE INVENTION

Field of the Invention

This disclosure relates to a peripheral tracking system and method.

Description of the Prior Art

Although peripherals for enabling users to provide more natural inputs have been used for many years, there has been a recent increase in the number of such devices. For example, many devices use accelerometers or other hardware motion sensors to detect motion of a peripheral. This tracked motion may be used as an input by a user, enabling more natural motions (such as moving a game controller to simulate a golf swing) to be used instead of button presses so as to increase the immersiveness of the content.

The interest in such input methods and devices has been driven in recent years by the development of head-mountable display units (HMDs) that enable users to experience virtual reality (VR) or augmented reality (AR) content. A user's level of immersion in such an experience is considered to be important to their enjoyment of the displayed content, and as such the use of motion-tracked peripherals is seen as being desirable.

In many embodiments, it is sufficient that the motion of the peripheral is tracked; the absolute position (that is to say, a position in the real environment) may be of little consequence. For example, in a golf game it may be irrelevant where the user performs the swing in the room—the motion of the 'golf club' (that is, the peripheral representing the golf club) is all that is relevant for performing the action as it is the user's mimicking of an action that is important rather than its location.

However, in other embodiments it is considered that the absolute position of the peripheral is of use as an input. Such information may be difficult to obtain, however, as the use of accelerometers or other hardware motion detectors can often be prone to error (for example, due to sensor drift) when tracking a position. This can result in a large error building up relatively quickly, and the detected position of a peripheral being significantly different to the actual position of the peripheral.

One solution that is proposed is that of tracking the peripheral using a camera located at a processing device associated with the peripheral (such as a Sony® PlayStation® 4 that is associated with a game controller). Such a method may be advantageous in that additional measurements of the position of the peripheral may be obtained and used to correct the detected motion from the hardware motion detector as appropriate. There are numerous drawbacks associated with such methods however, such as the potential problem of occlusions and the potential requirement for additional hardware to be provided.

It is in the context of the above problems that the present invention arises.

SUMMARY OF THE INVENTION

It is to be understood that both the foregoing general description of the invention and the following detailed description are exemplary, but are not restrictive, of the invention. This disclosure is defined by claim 1.

Further respective aspects and features of the disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 schematically illustrates an image capture sequence;

FIGS. 4a and 4b schematically illustrate a tracking embodiment;

DESCRIPTION OF THE EMBODIMENTS

Figure 1:
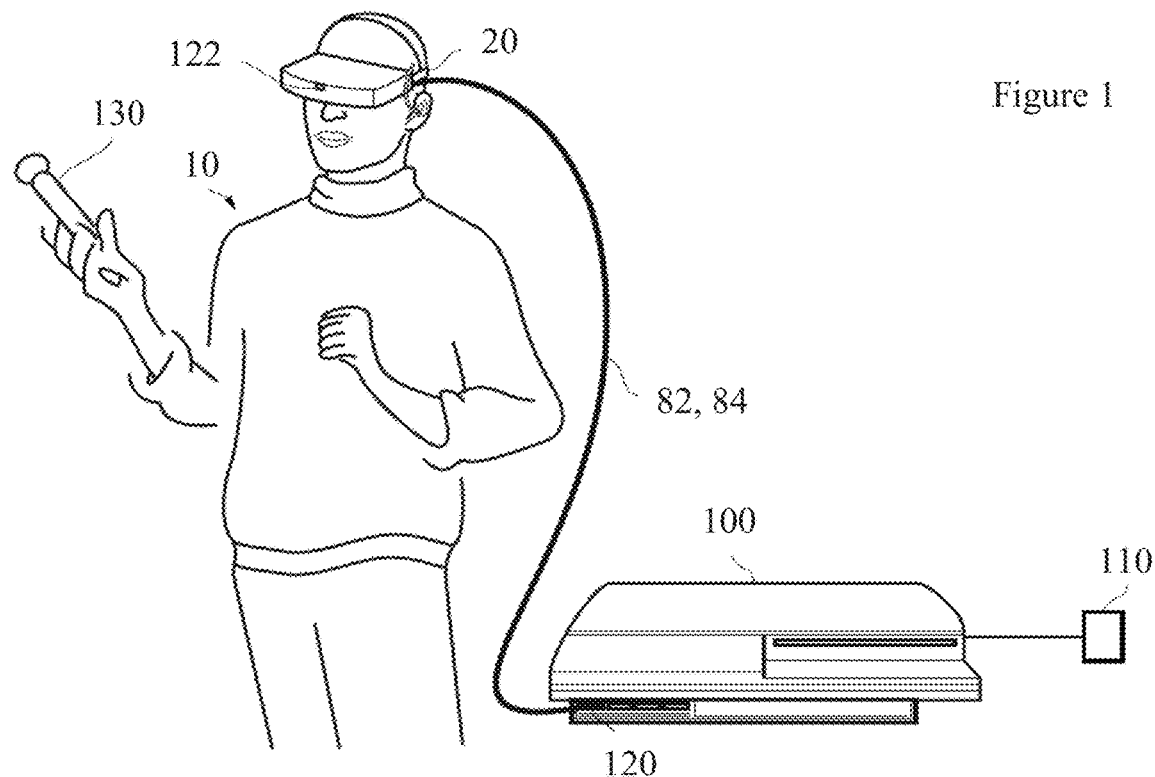
FIG. 1 schematically illustrates a user wearing an HMD.

Referring now to the drawings, wherein like reference numerals designate identical or corresponding parts throughout the several views, embodiments of the present disclosure are described. It should be understood that features of these embodiments may be combined as appropriate, rather than being considered to be suitable only in the exemplary configurations as described.

FIG. 1 schematically illustrates a user wearing an HMD 20 connected to a Sony® PlayStation 3® games console 100 as an example of a base device. The games console 100 is connected to a mains power supply 110 and (optionally) to a main display screen (not shown). A cable, acting as the cables 82, 84 discussed above (and so acting as both power supply and signal cables), links the HMD 20 to the games console 100 and is, for example, plugged into a USB socket 120 on the console 100. Note that in the present embodiments, a single physical cable is provided which fulfils the functions of the cables 82, 84. In FIG. 1, the user is also shown holding a hand-held controller 130 which may be, for example, a Sony® Move® controller which communicates wirelessly with the games console 100 to control (or to contribute to the control of) game operations relating to a currently executed game program.

The video displays in the HMD 20 are arranged to display images generated by the games console 100, and the earpieces in the HMD 20 are arranged to reproduce audio signals generated by the games console 100. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 100 via the cable 82, 84. These images may be used for motion tracking, presentation to a user, or any combination of these or other purposes; to aid motion tracking a light source (for example, an infra-red light source or visible light source) may be provided. In some embodiments, the camera 122 may be a depth camera or a stereoscopic camera arrangement. Similarly, if motion or other sensors are provided at the HMD 20, signals from those sensors may be at least partially processed at the HMD 20 and/or may be at least partially processed at the games console 100. The use and processing of such signals will be described further below.

The USB connection from the games console 100 also provides power to the HMD 20, according to the USB standard, although power may be received from any number of alternative or additional sources.

As noted above, tracking of the position of the HMD may be performed using images captured by a camera associated with the HMD. This tracking data may be refined or otherwise supplemented by additional motion tracking data, such as that generated by an accelerometer or gyroscope.

Figure 2A:
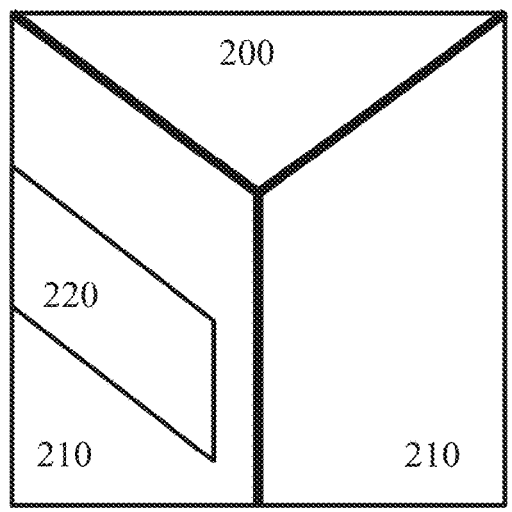
FIGS. 2a and 2b schematically illustrate images captured by a camera associated with the HMD.
Figure 2B:
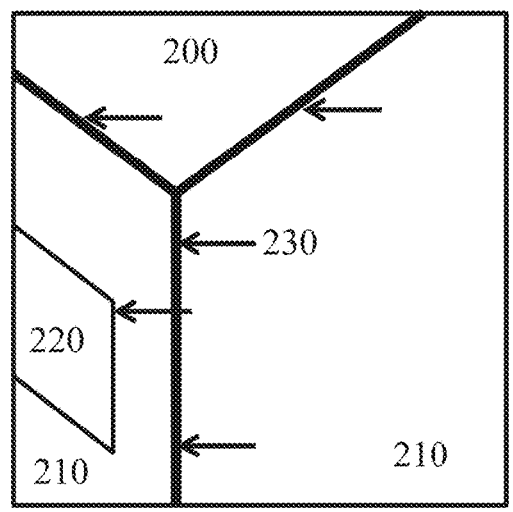

FIGS. 2a and 2b schematically illustrate images captured by a camera mounted on an HMD.

FIG. 2a illustrates a first image captured by the camera. The image is of an upper corner of a room; the ceiling 200 is above the walls 210. A window 220 provides an example of a feature that may be detected on the left wall 210, although of course any suitable features may be used as reference points in the captured images.

FIG. 2b illustrates a second image captured by the camera, the image being captured at a later time than that of 2a. The arrows 230 are not part of the captured image; rather they serve to indicate the motion of features in the image relative to the earlier image. In this image, it is apparent that each of the features has shifted a fixed amount to the left; this may be taken as being indicative of a rotation or translation of the camera (and therefore the HMD and user's head) to the right, rather than a movement of the features themselves.

By performing an analysis of the feature motion between images, an accurate measure of the motion of the HMD can be determined and therefore tracking of the HMD can be performed.

Rather than tracking the motion of the HMD explicitly, in some embodiments it is possible that the location of the HMD may be derived with each image frame. In some examples, this may be achieved by using a predefined mapping of the environment as a reference for the images. Feature identification may be performed on each image, and compared to known features from the environment mapping to identify a relative position of the features and the HMD. Of course, such a method may be used in conjunction with the method of measuring inter-image motion of features where appropriate, for example to reduce processing burden by performing the locating process less frequently.

Rather than using a predefined mapping, in some embodiments may instead utilise mapping techniques to generate the map. For example, a Simultaneous Localisation and Mapping (SLAM) technique could be used to both generate a map of the environment and to identify the location of the HMD within that environment at the same time.

It is considered advantageous that tracking of one or more peripherals used with the HMD can also be performed. While this may be performed using additional cameras, for example located at a games console or the like, or hardware motion detections such as accelerometers, the complexity of the entertainment system may be reduced if this tracking is performed by the same camera as is used for the HMD tracking. However, this presents numerous problems due to the different technical considerations when performing the HMD and peripheral tracking. While these considerations may be addressed in a single image, for example by capturing images of the environment and peripheral using a raster of pixels with different exposures and/or wavelengths of light to which the pixels are sensitive, this may not be suitable for all purposes.

FIG. 3 shows a portion of an image capturing scheme in which images are captured using different parameters on an interleaved basis. While only two sets of images (A and B) are shown here, of course this could be extended to any suitable number of sets of images. In the present example, it is considered that images $A_1$ to $A_4$ are associated with the HMD tracking while images $B_1$ to $B_4$ are associated with peripheral tracking. Further image sets, not shown here, may also form a part of the image capture scheme. These images may be used for other purposes, such as capturing images for display to a user or for tracking additional peripherals, or may serve no functional purpose at all.

Of course, the order in which images are captured may be modified, and it is not essential that the images are captured using each scheme in a 1:1 ratio. For example, an image capture scheme such as $A_1, A_2, B_1, A_3, A_4, B_2$ could be used, or $A_1, A_2, B_1, B_2, A_3, A_4, B_3, B_4$. Consecutive image frames that belong to the same set (or a single image frame, if there are no consecutive image frames that belong to the same set) constitute a group belonging to that set. For instance, in each of the two examples in this paragraph there are 4 groups present; '$A_1, A_2$' being the first, '$B_1$' or '$B_1, B_2$' being the second, '$A_3, A_4$' being the third and '$B_2$ or '$B_3, B_4$' being the final group. Exemplary differences in the image capture parameters for set A and set B are discussed below; however, it should be noted that these are to be considered non-limiting and that these parameters may be modified as appropriate for a particular implementation.

Irregular arrangements of the image capture order are also considered as being suitable in some embodiments. This includes arrangements such as $A_1, A_2, B_1 A_3, B_2, A_4, B_3, B_4$, for example. Such arrangements of an image capture order may generated in a pseudo-random fashion, in some cases, or may simply follow a pre-defined pattern in which the groups are of different sizes.

When multiple images are provided in a given group, a single position detection (of the camera-to-peripheral position in the case of "B" groups or the camera-in-the-environment position in the case of "A" groups can be generated from that given group, for example by averaging detections for each image in the group. Alternatively, individual detections can be made for each image in the group and a representative detection selected, for example in the case of the camera position, as a detection closest in time to a detection of the camera-to-peripheral position (so that for example, in an example arrangement $A_1, A_2, B_1, A_3, A_4, B_2, A_5, A_6$, the camera position detections used in respect of the detection made for the image $B_1$ would be those from $A_2, A_3$, whereas the camera position detections used in respect of the detection made for the image $B_2$ would be those from $A_4, A_5$.)

In the case that a third set of images are captured in addition to sets of images A and B, the images of the third set may be interleaved with those of the first two sets in any suitable fashion. For example, where D represents a group of one or more images of the third set, ABDABD, ABDA-BABD, ADBDADBD or any other interleaving may be used as appropriate.

For the HMD tracking performed using images $A_1$ to $A_4$, it is considered advantageous that the image is sufficiently bright so as to enable the identification of environmental features in the image. This may be achieved using one or both of an extended exposure time and the use of a light source (such as one mounted on the HMD, or on a console associated with the HMD) to illuminate the environment. An example of the image capture is shown in FIG. 4a, in which a light source 400 mounted on the HMD is activated to illuminate the environment.

For the peripheral tracking performed using images $B_1$ to $B_4$, it is considered advantageous that the peripheral is easily identified from the images. As is shown in FIG. 4b, this may include controlling the peripheral to emit light rather than the light source 400 associated with the HMD as shown in FIG. 4a. This will often result in the peripheral being the brightest object in the environment, and therefore potentially easier to identify in the captured images. A shorter exposure time when capturing the image may also be used, either instead of or in addition to the described lighting configuration. The peripheral may be controlled to emit light at all times, or only when image frames belonging to set B are to be captured (for example, coordinated by a timing signal transmitted from the apparatus controlling the camera to the peripheral). The latter may potentially enable an enhanced tracking process for the HMD using the A frames. In some examples, such illumination intermittently emitted by the peripheral may be in the non-visible range (for example, infra-red illumination) so as not to cause subjective disturbance to the user.

When tracking the peripheral using the same camera as that used for tracking the peripheral, the position of the peripheral may be determined relative to the HMD only. In order to obtain the actual (real environment) position of the peripheral, it is necessary to factor in detections of the HMD position at that time. However, due to the alternating image capture scheme discussed above, position information for the HMD at the exact time of the peripheral tracking is not available.

Using HMD position information derived from image $A_1$ in conjunction with the peripheral position information derived from image $B_1$ can result in inaccuracies and jittery position data for the peripheral, as this the HMD position is considered to be historical data at this point. While this offers a reasonable approximation of the peripheral position, it may not be suitable for applications which require refined position data.

Figure 5:
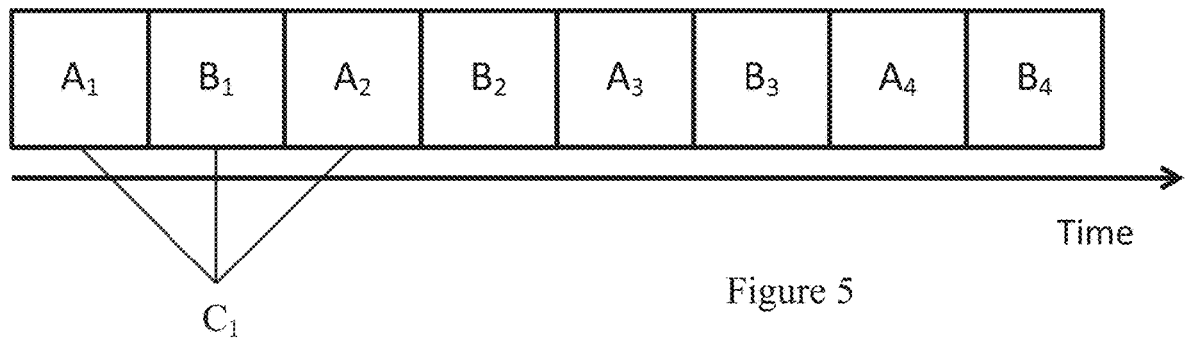
FIG. 5 schematically illustrates an image capture sequence.

FIG. 5 schematically illustrates the generation of third position information, which is represented by the peripheral position data $C_1$. This peripheral position data is generated based upon the position data generated from the image $B_1$ by using a function of the HMD position data generated from images $A_1$ and $A_2$ (or in other words, a function of the first position information corresponding to a group of images in the first set of images preceding the given group of images and the first position information corresponding to a group of images in the first set of images following the given group of images) While this introduces a latency of one camera frame in the peripheral tracking method, advantageously the accuracy of the peripheral tracking may be improved along with the smoothness of the tracking. This third position information indicates the position of the one or more peripherals within the environment, rather than simply the image position of the one or more peripherals that is identified by using the position information derived from the B images.

The function of the HMD position data generated from images $A_1$ and $A_2$ may be any suitable function for deriving a position based upon the two sets of position data. For example, an average of the position data may be generated such that the function requires taking the mean value of the two sets of position data. In some cases, this may be a weighted average—for example, to increase the contribution to the function to position data that was captured closest to the desired time.

Alternatively, or in addition, measurements of the HMD acceleration may be used to generate weighting values—for example, if a positive acceleration is performed between the capture of images $A_1$ and $A_2$ then the position of the user at the time halfway between the captured images would not necessarily be the halfway point between the respective positions associated with those images. In this case, the weighting factor would be increased for the position data associated with the earlier image, while for a deceleration the weighting factor would be greater for the position data associated with the later image.

In such an embodiment, position data may be generated in this manner for each of the B images or image groups. For example, peripheral position data $C_2$ may be generated using a combination of HMD position data generated from images $A_2$ and $A_3$ in conjunction with peripheral position data generated from image $B_2$.

In some embodiments, peripheral tracking data C is generated at the same rate as B images are captured (that is, every other frame in the example of FIG. 5). However, in other embodiments peripheral tracking data C may be generated at the same rate as the image capture rate using a rolling average of position data obtained from the A image frames and B image frames respectively. In some embodiments, an approach may be implemented that may be able to select either method in dependence upon the application or scenario—for instance, if a higher sampling rate would be useful for peripheral tracking (such as for a particular task or input) then the latter approach may be taken for at least a subset of a user's interactions.

Figure 6:
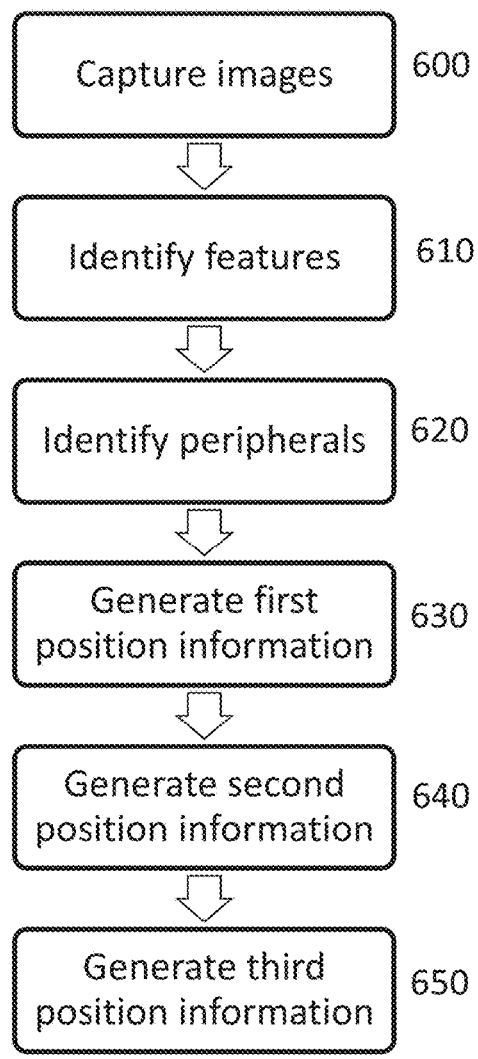
FIG. 6 schematically illustrates a peripheral tracking method.

FIG. 6 schematically illustrates method for tracking one or more peripherals operable by a user in a real environment.

A step 600 comprises capturing images of the real environment using a camera mountable upon the user, for example upon an HMD that is wearable by the user.

A step 610 comprises identifying features in images belonging to a first set of images captured by the camera.

A step 620 comprises identifying the image position of one or more peripherals in one or more images belonging to a second set of images captured by the camera, wherein the first set of images and the second set of images captured by the camera are interleaved such that groups of one or more images from each set are captured in turn.

A step 630 comprises generating first position information for the camera in the real environment in dependence upon one or more of the identified features. This step is performed at a time corresponding to the capture of an image upon which the feature identification step 610 is performed; that is, the generating of position information for the camera (and therefore HMD, if the camera is mounted upon the HMD) is performed at the time of feature detection for frame $A_1$ in the example of FIG. 5 above.

A step 640 comprises generating respective second position information for the one or more peripherals relative to the camera in dependence upon the identified image position of the one or more peripherals. This step is performed at a time corresponding to the capture of an image upon which the peripheral identification step 620 is performed; that is, the generating of position information for the peripheral is performed at the time of feature detection for image frame $B_1$ in the examples above.

In steps 630 and 640, the time corresponding to the image capture may be the time of the image capture, or a time shortly after this if there is a delay before a captured image may be processed. For example, if the images are transmitted from the camera to an associated processing device (such as a games console) for processing via the HMD then a delay between image capture and image processing is introduced.

A step 650 comprises generating third position information identifying the position of the one or more peripherals in the real environment by combining the second position information for a given image with an average of the first corresponding to a given group of images in the second set of images with a function of the first position information corresponding to a group of images preceding the given group of images and the first position information corresponding to a group of images in the first set of images following the given group of images.

This step is performed at a time corresponding to the capture of the succeeding image upon which the feature identification step 610 is performed; that is, the generating of third position information is performed at the time of feature detection for frame $A_2$ in the example of FIG. 5 above. In some embodiments, the function is an average of the position information; as discussed above, this may be a weighted average if appropriate.

Figure 7:
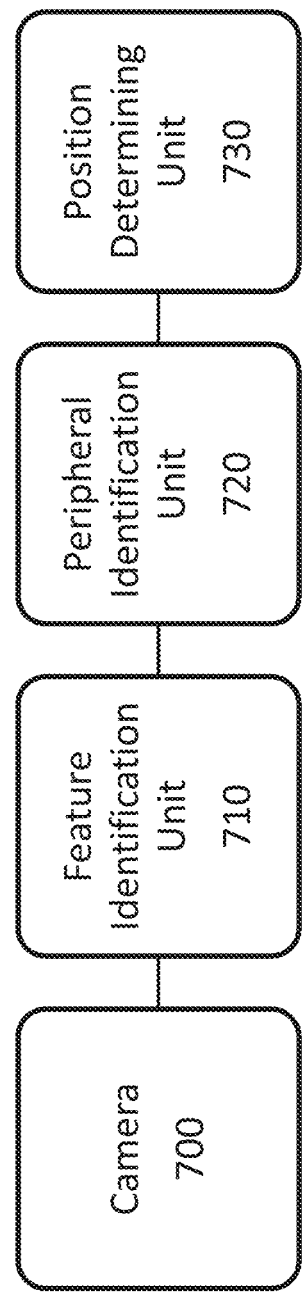
FIG. 7 schematically illustrates a peripheral tracking apparatus.

FIG. 7 schematically illustrates a system for tracking one or more peripherals operable by a user in a real environment, the system comprising a camera 700, a feature identification unit 710, a peripheral identification unit 720, and a position determining unit 730.

The camera 700, mountable upon the user and/or HMD, is operable to capture images of the real environment and/or the one or more peripherals. In some embodiments, images are captured with different exposure times for different sets of one or more captured images. For example, as described above, a longer exposure time may be used when capturing images of the environment for HMD tracking than when capturing images of the peripheral for peripheral tracking. In some embodiments, the camera 700 comprises a wide angle lens (such as a fish-eye lens, or any lens with a field of view greater than 60°) for capturing images.

In some embodiments, the system also comprises a light source (such as reference 400 of FIG. 4a) operable to illuminate the environment for at least a first set of one or more image capture frames to enable the camera to capture brighter images of the environment, which may lead to improved feature recognition.

In some embodiments, the camera is operable to capture images of the peripheral when lights associated with the peripheral are illuminated. As discussed above, in some embodiments the peripheral is operable to be illuminated (for example, by LEDs on the peripheral) in frames in which the light source operable to illuminate the environment is not active.

The feature identification unit 710 is operable to identify features in images belonging to a first set of images captured by the camera.

The peripheral identification unit 720 is operable to identify the image position of one or more peripherals in one or more images belonging to a second set of images captured by the camera, wherein the feature identification unit and peripheral identification unit perform their respective identification processes on interleaved sets of one or more captured images. As discussed with reference to the step 620 of FIG. 6, the first set of images and the second set of images captured by the camera are interleaved such that groups of one or more images from each set are captured in turn.

As noted above, examples of interleaved sets of one or more images include an arrangement of images into an ABAB format or an AABBAABB format, wherein A and B represent images belonging to different sets; in some embodiments the sets may have different numbers of captured image frames in them, such as in the AABAAB format described above.

The position determining unit 730 is operable to generate first position information for the camera in the real environment in dependence upon one or more of the identified features, and to generate respective second position information for the one or more peripherals relative to the camera in dependence upon the identified image position of the one or more peripherals.

The position determining unit 730 is also operable to generate third position information identifying the position of the one or more peripherals in the real environment by combining the second position information corresponding to a given group of images in the second set of images with a function of the first position information corresponding to a group of images in the first set of images preceding the given group of images and the first position information corresponding to a group of images in the first set of images following the given group of images.

In some embodiments, the position determining unit 730 is operable to generate the third position information using the first position information corresponding to the group of images in the first set of images immediately preceding the given group of images and first position information corresponding to a group of images in the first set of images immediately following the given group of images.

In some embodiments, the position determining unit 730 is operable to use a map of the environment to generate position information. For example, the map may be generated using a simultaneous localisation and mapping process.

Alternatively, or in addition, the system may comprise one or more hardware motion detectors associated with the camera 700 for generating motion tracking information. Examples of such hardware motion detectors include accelerometers and gyroscopes.

A number of variations to the system describe above are considered in the present disclosure.

In some embodiments, the camera 700 is operable to capture a third set of images. As noted above, these images may be used for other purposes, such as capturing images for display to a user or for tracking additional peripherals, or may serve no functional purpose at all. In some embodiments, each of the three sets of images comprises different numbers of groups of images, such that there is not a 1:1:1 ratio between the numbers of groups of images for each function. It is also envisaged that in some embodiments the first, second and third sets of images comprise groups of different respective numbers of images.

In some embodiments the groups comprise different numbers of images for each set; that is, the number of images that form each group may be different for HMD tracking than for peripheral tracking. This may be advantageous in increasing the frequency of the tracking for a prioritised device. It is also considered that the groups belonging to a set of images may comprise varying numbers of images; for example, in an AABABAABAAAB arrangement the number of image frames in the A groups vary between the groups belonging to that set. In more general terms, in some embodiments at least two of the groups comprise different numbers of images for each group. In some embodiments in which three sets of images are captured, the groups belonging to at least one of the first, second and third sets of images comprise numbers of images which vary from group to group The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for tracking one or more peripherals operable by a user in a real environment, the system comprising:
 a camera, mountable upon the user, operable to capture images of the real environment;
 a feature identification unit operable to identify features in images belonging to a first set of images captured by the camera;
 a peripheral identification unit operable to identify the image position of one or more peripherals in one or more images belonging to a second set of images captured by the camera; and
 a position determining unit operable to generate first position information for tracking a location of the camera in the real environment in dependence upon one or more of the identified features, and to generate respective second position information for tracking positions of the one or more peripherals relative to the camera in dependence upon the identified image position of the one or more peripherals,
 wherein the first set of images and the second set of images captured by the camera are interleaved such that groups of one or more images from each set are captured in turn, and
 wherein the position determining unit is operable to generate third position information for tracking the positions of the one or more peripherals in the real environment to yield different tracking by combining the second position information corresponding to a given group of images in the second set of images with a function of the first position information corresponding to a group of images in the first set of images preceding the given group of images and the first position information corresponding to a group of images in the first set of images following the given group of images.

2. A system according to claim 1, comprising a light source operable to illuminate the environment for at least a first set of one or more image capture frames.

3. A system according to claim 1, wherein the camera is operable to capture images of the peripheral when lights associated with the peripheral are illuminated.

4. A system according to claim 1, wherein images are captured with different exposure times for different sets of one or more captured images.

5. A system according to claim 1, wherein the function is an average of the position information.

6. A system according to claim 1, wherein the position determining unit is operable to use a map of the environment to generate position information.

7. A system according to claim 1, wherein the position determining unit is operable to generate the third position information using the first position information corresponding to the group of images in the first set of images immediately preceding the given group of images and first position information corresponding to a group of images in the first set of images immediately following the given group of images.

8. A system according to claim 1, comprising one or more hardware motion detectors associated with the camera for generating motion tracking information.

9. A system according to claim 1, wherein the camera is operable to capture a third set of images.

10. A system according to claim 9, wherein the first, second and third sets of images comprise groups of different respective numbers of images.

11. A system according to claim 1, wherein at least two of the groups comprise different numbers of images for each group.

12. A system according to claim 9, wherein the groups belonging to at least one of the first, second and third sets of images comprise numbers of images which vary from group to group.

13. A method for tracking one or more peripherals operable by a user in a real environment, the method comprising:
 capturing images of the real environment using a camera mountable upon the user;
 identifying features in images belonging to a first set of images captured by the camera;
 identifying the image position of one or more peripherals in one or more images belonging to a second set of images captured by the camera, wherein the first set of images and the second set of images captured by the camera are interleaved such that groups of one or more images from each set are captured in turn;
 generating first position information for tracking a location of the camera in the real environment in dependence upon one or more of the identified features;
 generating respective second position information for tracking positions of the one or more peripherals relative to the camera in dependence upon the identified image position of the one or more peripherals; and
 generating third position information for tracking the positions of the one or more peripherals in the real environment to yield different tracking by combining the second position information corresponding to a given group of images in the second set of images with a function of the first position information corresponding to a group of images preceding the given group of images and the first position information corresponding to a group of images in the first set of images following the given group of images.

14. A non-transitory machine-readable storage medium which stores computer software that when executed by a computer causes the computer to track one or more peripherals operable by a user in a real environment, by carrying out actions, comprising:
 capturing images of the real environment using a camera mountable upon the user;
 identifying features in images belonging to a first set of images captured by the camera;
 identifying the image position of one or more peripherals in one or more images belonging to a second set of images captured by the camera, wherein the first set of images and the second set of images captured by the camera are interleaved such that groups of one or more images from each set are captured in turn;

generating first position information for tracking a location of the camera in the real environment in dependence upon one or more of the identified features;

generating respective second position information for tracking positions of the one or more peripherals relative to the camera in dependence upon the identified image position of the one or more peripherals; and generating third position information for tracking the positions of the one or more peripherals in the real environment to yield different tracking by combining the second position information corresponding to a given group of images in the second set of images with a function of the first position information corresponding to a group of images preceding the given group of images and the first position information corresponding to a group of images in the first set of images following the given group of images.

* * * * *